Figure 1:
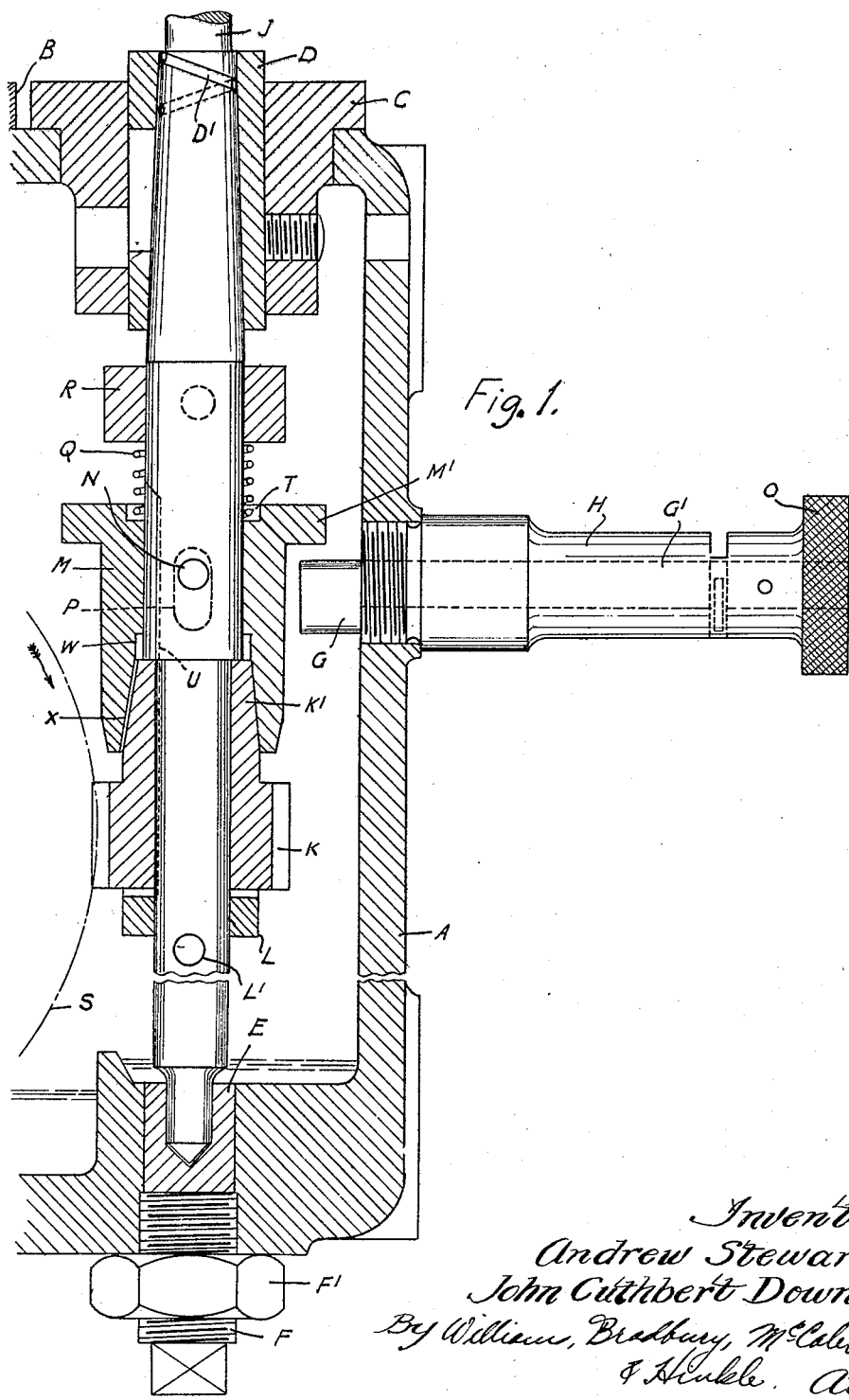

April 5, 1932. A. STEWART ET AL 1,852,067
SPINDLE DRIVING MECHANISM FOR SPINNING AND TWISTING MACHINES
Filed April 30, 1931 2 Sheets-Sheet 1

Inventors
Andrew Stewart
John Cuthbert Downie
By William, Bradbury, McCaleb
& Hinkle. Attys.

Patented Apr. 5, 1932

1,852,067

UNITED STATES PATENT OFFICE

ANDREW STEWART AND JOHN CUTHBERT DOWNIE, OF ANGUS, BENGAL, BRITISH INDIA, ASSIGNORS TO THE ANGUS COMPANY LIMITED, OF CALCUTTA, INDIA, A CORPORATION OF INDIA

SPINDLE-DRIVING MECHANISM FOR SPINNING AND TWISTING MACHINES

Application filed April 30, 1931, Serial No. 534,004, and in Great Britain May 9, 1930.

This invention relates to spindle-driving mechanism for spinning, twisting or like frames, more particularly for spinning or twisting jute, hemp, flax and like yarns, and has reference to spindle mechanism in which a constantly driven pinion drives the spindle through a friction clutch having cone clutch faces which are held in engagement with each other by a spring and disengaged by a manually-operated mechanical stop. The present invention also has reference to such spindle mechanism in which a positive clutch or claw clutch is used in conjunction with the friction clutch.

It is one of the objects of the present invention to provide a friction drive for the spindle which will efficiently replace the usual band drive and which will eliminate the faults common to most of the known friction drives for spinning and like spindles in which the tendency of the clutch faces to seize during working without the slightest warning prevents the spindle from being stopped by hand with perfect safety without the use of a mechanical stop, and in which the tendency of the clutch faces to slip gives rise to irregular spindle rotation and renders spinning impossible. The present invention provides a spindle friction drive of sufficient strength to drive the spindle at any spinning speed and in which the absence of seizure and the freedom from slip are equally pronounced. The friction clutch is so lubricated as to allow for a sufficiently gradual acceleration of the spindle speed when starting and also to allow the spindle to be stopped by hand with ease without disengaging the clutch by mechanical means.

According to the present invention a spring-loaded friction clutch of the cone type having the male clutch member mounted below the female clutch member and in which the male clutch member is rotated by or integral with a driving pinion freely rotatable upon the spindle, while the female clutch member is slidably keyed to the spindle, has an oil well in the female clutch member which supplies oil to a longitudinal groove or passage in the periphery of the spindle or bearing surface of the female clutch member, the said groove or passage supplying the oil to the upper end of the clutch faces, preferably to an annular chamber at the upper end of the clutch faces, from whence the oil is free to sicker down between the clutch faces, preferably along a groove or grooves cut therein, and is also free to lubricate the bearing surfaces of the pinion which may rotate upon a thrust washer fixed to the spindle. This ensures continuous lubrication of the clutch faces and pinion bearing surfaces and it is therefore easy to stop the spindle without disengaging the clutch mechanically, because the oil in the groove or grooves in the clutch face or faces immediately lubricates the faces of the clutch when the speed of the spindle is suddenly stopped by hand for the purpose of joining the ends of broken yarn. When the spindle is stationary, the oil in the oil well of the female clutch member (which is supplied thereto by splash feed) is free to sicker down the longitudinal passage in or on the periphery of the spindle and supplies a film of oil to the clutch faces, thus ensuring correct working of the clutch. When the spindle is re-started, this film of oil is gradually expelled by the spring pressure on the clutch members and as the faces become drier the friction clutch takes up the full load, thus enabling the spindle to perform its duty correctly without jar.

Means are provided for mechanically engaging and releasing the clutch when required, said means preferably consisting of a rotatable eccentric which may be engaged with a flange or shoulder on the female clutch member.

The present invention also consists in incorporating a positive clutch in the aforesaid friction drive so as to enable the spindle to be driven either by friction alone or by both a positive drive and friction drive combined. For this purpose a claw clutch member is slidably keyed on the female clutch member and is adapted to engage pins or projections on the male friction clutch member. The claw clutch member carries a flange or collar which is engaged by the rotatable eccentric and near the end of its outward movement the claw clutch member engages and displaces the female clutch member. To this end the eccentric is operated by a knob or like device which can be retained in either of two positions to cause the eccentric to disengage either the claw clutch alone or both the claw clutch and the friction clutch.

In order that the invention may be more clearly understood, reference is hereinafter made to the accompanying drawings whereon:—

Figure 2:
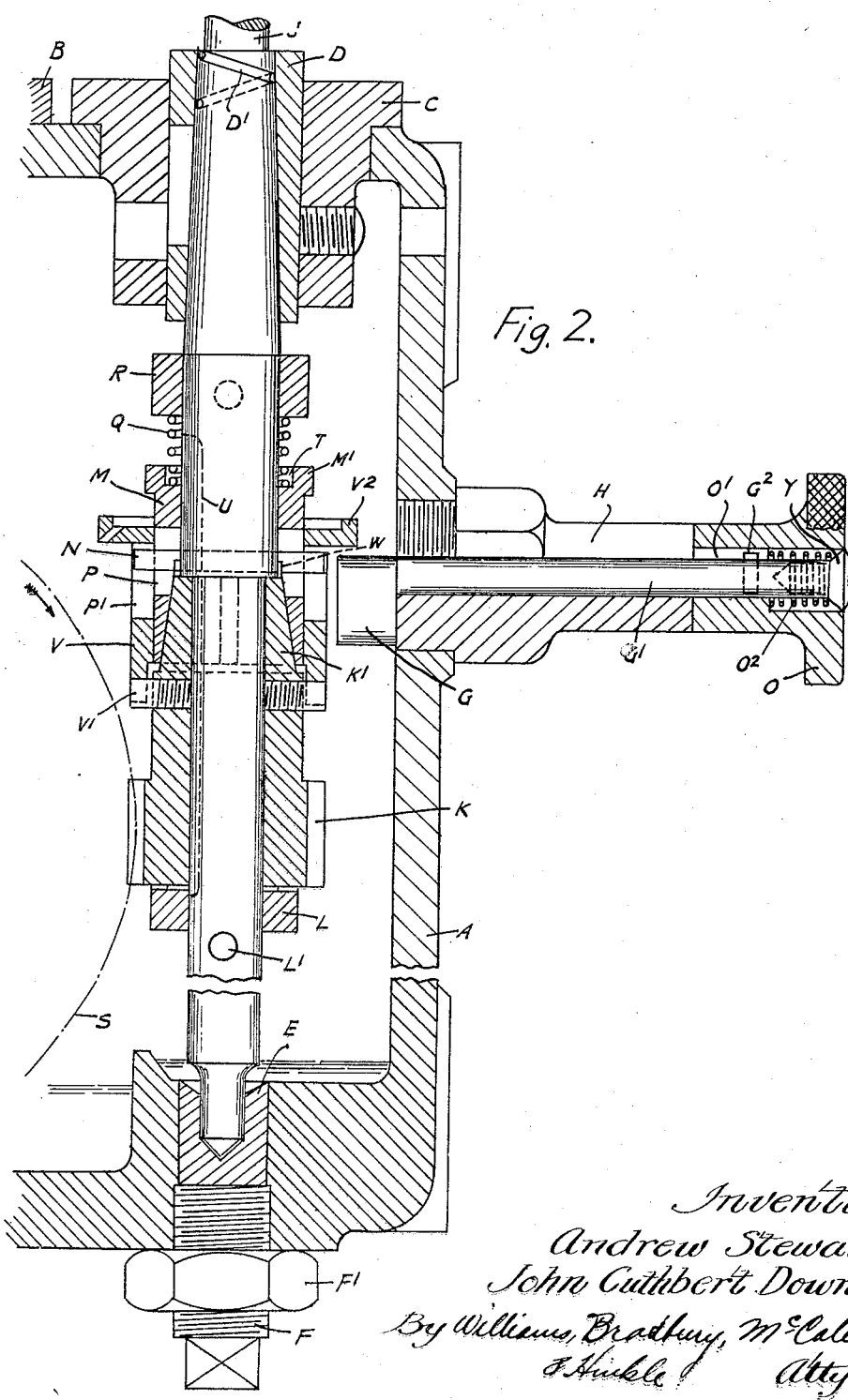

Fig. 1 illustrates a practical construction of spindle-driving mechanism incorporating only a friction drive according to the present invention, while Fig. 2 illustrates a construction incorporating both a positive drive and friction drive. On the drawings the mechanism is shown in vertical longitudinal section.

Referring to Fig. 1, A represents a gear case provided with a cover B. The gear case A may be designed to accommodate fourteen or sixteen spindles in the spinning frame. A cap or gland C is secured in the top of the gear case A by screws not shown and carries a spindle neck bush D which forms a top bearing for the spindle J. The spindle is supported at the toe by a foot-step E and can be adjusted by a plug F locked in position by the lock-nut F'. A pinion K, which is a running fit on the spindle J, is driven by a wheel S. Integral with and arranged above the pinion K is a male clutch member K'. A thrust washer L is mounted on the spindle and located thereon by means of a pin L'. The thrust washer L takes the downward thrust of the combined pinion and male clutch member K, K'. Upon the spindle J above the combined pinion and male clutch member is mounted a female clutch member M having slots P therein which are engaged by the projecting ends of a driving pin N passed through the spindle J. A spring Q is kept in contact with the clutch member M by means of a collar R adjustably secured on the spindle J. The slots P in the female clutch member M allow for an axial movement of the clutch member on the spindle when a collar or flange M' on the female clutch member M is engaged by the eccentric face of an eccentric G which is carried by a shaft G' mounted in a socket H screwed into the gear case. On turning the shaft G' by means of a small knob O, the female clutch member M can be engaged with or released from the combined male clutch member and pinion K, K'.

In Fig. 1 of the drawings the spindle is shown in driving position with the female clutch member M forced into contact with the male clutch member K' by the spring Q. The pinion and clutch member K, K' receive their motion from the driving wheel S and this movement is transmitted through the female clutch member M and slots P to the driving pin N and thus to the spindle J.

An oil well T is provided in the upper end of the female clutch member and oil is thrown into this well by the rotation of the wheel S, the oil being contained in the lower part of the gear case A as indicated in the drawings. The oil in the oil well T is free to trickle down a groove U cut in the spindle J and the oil settles in an annular chamber W between the male and female clutch members and trickles down a groove or grooves X cut in either of the clutch faces and also down the extended groove U formed in that part of the spindle which forms a bearing surface for the combined pinion and male clutch member K, K'. The oil is thus supplied to the thrust washer L, thereby ensuring continuous oiling of the clutch faces, the bearing surface upon which the combined pinion and male clutch member rotates and the surface of the thrust washer L upon which the pinion bears.

The spindle can be readily stopped by hand, without disengaging the clutch, by means of the eccentric G because the oil in the groove or grooves X immediately lubricates the faces of the clutch when the speed of the spindle is stopped for the purpose of joining the ends of broken yarn.

In order to stop the spindle mechanically, the shaft G' of the eccentric G is turned to cause the female clutch member to be lifted against the pressure of the spring Q. This brings the female clutch member away from the male clutch member and the combined pinion and male clutch member K, K' is now free to revolve on the stationary spindle J.

When the spindle is stationary, the oil thrown into the oil well T is free to trickle down the groove U cut in the spindle. The oil thus supplied lubricates the clutch faces and the film of oil thus ensured provides for the correct working of the clutch. The oil in the annular chamber W also assists in the lubrication of the clutch faces.

In order to start the spindle after it has been mechanically stopped, the rotation of the shaft G' is reversed, thereby withdrawing the eccentric G from the collar M' of the female clutch member and allowing the latter to make contact with the male clutch member. The film of oil between the friction faces is then gradually expelled by the pressure of the spring Q acting on the female clutch member and as the faces become dryer the friction clutch takes up the full load. This ensures correct acceleration of the spinning spindle without jar.

In order to prevent oil from sickering through the spindle neck D, a short spiral groove D' is cut in the spindle inside the neck D, the groove D' being cut in such a direction that when the spindle revolves, excess oil is automatically forced down the spindle.

The friction surfaces may be made of sufficient size and at such an angle as to drive the spindles at any desired spinning speed, while the aforesaid construction ensures that the friction clutch is so lubricated as to allow for a sufficiently gradual acceleration of the spindle spaced when starting from rest while allowing the spindle to be stopped by hand with perfect safety without mechanically disengaging the clutch.

The arrangement of the friction clutch above the pinion K also eliminates the trouble which has been experienced with spindle drives of the type in which a friction clutch is fitted below the pinion, by eliminating the hammering action which may be imparted to the friction surfaces by the gearing during operation, when the clutch is arranged below the pinion, this hammering action giving rise to rapid vibration which ultimately causes seizure of the clutch faces.

It will be noted that the clutch faces are arranged in such a manner that the surplus oil drains from the clutch faces back into the lower part of the oil containing gear case A.

The mounting of the neck bush D in the cap C also enables the spindle to be lifted away entirely after removing the cap or neck gland C.

Fig. 2 illustrates a spindle driving mechanism in which, in addition to the ability to stop the spindle by hand and to drive by friction only, provision is also made for a combined positive drive and friction drive. In this case a claw clutch member V is slidably mounted on the female clutch member M and the driving pin N projects through the slots P in the female clutch member M and into slots P' in the claw clutch member V. The slots P and P' allow for an axial movement of the clutch members M and V on the spindle J and on one another when the eccentric face of the eccentric G comes in contact with the underside of a flange V² on the claw clutch member V. Fig. 2 of the drawings shows the claw clutch in gear. On turning the shaft G' of the eccentric G in one direction by means of the knob or lever or like device O, the claw clutch member V is lifted sufficiently clear of the driving pins V' carried by the combined pinion and male clutch member K, K' and the flange V² of the claw clutch member is brought into contact with the shoulder or flange M' of the female clutch member M. At this stage the spindle continues to be driven by friction only. In order to stop the spindle J, the eccentric G is further rotated and the female friction clutch member M is thereby lifted clear of the male friction clutch member K'.

In order to start the spindle after it has been mechanically stopped, the shaft G' of the eccentric is reversed and this allows the female friction clutch member M to make contact with the male clutch member K'. The film of oil between the clutch faces is gradually expelled as already described with reference to Fig. 1 until the friction surfaces take up the full load. Further rotation of the shaft C' allows the claw clutch member V to gradually engage the pins or projections V'.

It will be noted that distinct positions are necessary for the operation of the eccentric G, in order that the claw clutch may be disengaged without disengaging the friction clutch and in order that both the claw clutch and friction clutch may be disengaged when required. For this purpose the end face of the socket H is provided with stops (not shown) which engage stops on the knob or lever O. A key or feather G² on the spindle engages a keyway O' in the knob O and the knob O is held in place on the shaft G' by means of a spring O² confined between an internal shoulder in the knob O and the head of a screw Y screwed into the end of the shaft G'.

It is to be understood that the invention is not confined to the specific constructions herein described and illustrated, but is capable of modification without departing from the invention hereinafter claimed.

Having now particularly described and ascertained the nature of our said invention and in what manner the same is to be performed, we declare that what we claim is:—

1. Spindle-driving mechanism comprising a spindle, a driving pinion freely rotatable upon the spindle, a male cone clutch member rotatable upon and turning with said pinion, a female clutch member slidably mounted upon said spindle above the male clutch member and prevented from rotation on said spindle, spring loading means for urging the clutch members together, an oil well in the female clutch member, and an oil passage extending longitudinally between the female clutch member and the spindle and communicating at one end with said oil well, said passage feeding oil to the clutch faces.

2. Spindle-driving mechanism as specified in claim 1, wherein said passage opens into an annular chamber at the upper end of the clutch faces.

3. Spindle-driving mechanism as specified in claim 1 having an oil groove traversing one of the clutch faces.

4. Spindle-driving mechanism as specified in claim 1 wherein the oil passage is continued to feed oil to the bearing surface of the male clutch member.

5. Spindle-driving mechanism as specified in claim 1 wherein the oil passage is continued to feed oil to the bearing surface of the male clutch member and to the bearing surface of the pinion.

6. Spindle-driving mechanism as specified in claim 1 in combination with means for mechanically engaging and releasing the clutch members.

7. Spindle-driving mechanism as specified in claim 1 including a shoulder on the female clutch member, an eccentric engaging beneath said shoulder, means for rotatably supporting said eccentric, and means for manually rotating said eccentric.

8. Spindle-driving mechanism as specified in claim 1 including an oil-containing gear case enclosing said clutch members, bearings in said case for rotatably supporting said spindle, a driving wheel extending into said gear case and meshing with said pinion, and means for rotating said wheel to supply oil to the oil well of the female clutch member by splash feed, the oil draining from the clutch faces back into the lower part of the gear case.

9. Spindle-driving mechanism as specified in claim 1 including an oil-containing gear case enclosing said clutch members, a footstep bearing in the lower part of said gear case for supporting said spindle, an upper bearing bush, and a gland carrying said bush and removably fitted in the top of the gear case to enable the spindle to be lifted away complete with the parts assembled thereon.

10. Spindle-driving mechanism as specified in claim 1 including a positive clutch for connecting the pinion to the spindle operative only when the cone clutch faces are in engagement.

11. Spindle-driving mechanism as specified in claim 1 including a claw member slidably and non-rotatably mounted on the female clutch member, and projections on the male clutch member for cooperating with the claw clutch member when the cone clutch surfaces are in engagement.

12. Spindle-driving mechanism as specified in claim 1 including a claw clutch member slidably and non-rotatably mounted on the female clutch member, projections on the male clutch member for cooperating with the claw clutch member when the cone clutch surfaces are in engagement, a shoulder on the claw clutch member, a rotatable eccentric for engaging beneath said shoulder, means for manually rotating said eccentric, an abutment on the female clutch member engaged by the claw clutch member when the latter is partially lifted, and means for retaining said eccentric in either of two positions, in one of which the claw clutch is disengaged without lifting the female clutch member and in the other of which the female clutch member is lifted.

13. Spindle-driving mechanism comprising a gear case, a spindle bearing in the top of said gear case, a footstep bearing in the lower part of said gear case, a spindle mounted in said bearings, a pinion rotatable on said spindle, a male cone clutch member above said pinion and rotatable therewith upon the spindle, a thrust washer on the spindle to support said pinion, a female cone clutch member slidably and non-rotatably mounted on said spindle above the male clutch member, a spring in compression between the top of the female clutch member and an abutment on the spindle, a flange on said female clutch member, an eccentric engaging beneath said flange, a shaft carrying said eccentric and rotatably mounted in the front of said gear case, and a handle for rotating said shaft.

14. Spindle-driving mechanism comprising a gear case, a spindle bearing in the top of said gear case, a footstep bearing in the lower part of said gear case, a spindle mounted in said bearings, a pinion rotatable on said spindle, a male cone clutch member above said pinion and rotatable therewith upon the spindle, a thrust washer on the spindle to support said pinion, a female cone clutch member slidably and non-rotatably mounted on said spindle above the male clutch member, a spring in compression between the top of the female clutch member and an abutment on the spindle, a flange on said female clutch member, an eccentric engaging beneath said flange, a shaft carrying said eccentric and rotatably mounted in the front of said gear case, a handle for rotating said shaft, an oil well in the upper end of said female clutch member, and a groove in the spindle, said groove extending from the oil well to an annular space between the male and female clutch members and to the bearing surface of the pinion.

15. Spindle-driving mechanism comprising a gear case, a spindle bearing in the top of said gear case, a footstep bearing in the lower part of said gear case, a spindle mounted in said bearings, a pinion rotatable on said spindle, a male cone clutch member above said pinion and rotatable therewith upon the spindle, a thrust washer on the spindle to support said pinion, a female cone clutch member slidably and non-rotatably mounted on said spindle above the male clutch member, a spring in compression between the top of the female clutch member and an abutment of the spindle, a claw clutch member slidably and non-rotatably mounted on the female cone clutch member, projections turning with the pinion for engaging the claw clutch member when the cone clutch faces are engaged, a flange on the claw clutch member, an eccentric engaging beneath said flange, a shaft carrying said eccentric and rotatably mounted in the front of the gear case, means for manually operating said shaft, and an abutment on the female clutch member engaged by the claw clutch member when the latter is partially lifted by the eccentric.

In testimony whereof we hereto affix our signatures, this 2nd day of April, 1931.

ANDREW STEWART.
JOHN CUTHBERT DOWNIE.